(12) United States Patent
Eguchi et al.

(10) Patent No.: US 7,468,861 B2
(45) Date of Patent: Dec. 23, 2008

(54) MAGNETIC DISK APPARATUS WITH SHIELD FOR MAGNETIC HEAD

(75) Inventors: Takehiko Eguchi, Ibaraki (JP); Toshihiko Shimizu, Ibaraki (JP); Toshiya Shiramatsu, Ibaraki (JP); Mikio Tokuyama, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 294 days.

(21) Appl. No.: 11/223,457

(22) Filed: Sep. 9, 2005

(65) Prior Publication Data
US 2006/0056105 A1 Mar. 16, 2006

(30) Foreign Application Priority Data
Sep. 10, 2004 (JP) ............................. 2004-263305

(51) Int. Cl.
*G11B 33/14* (2006.01)
(52) U.S. Cl. .................................................. 360/97.02
(58) Field of Classification Search ... 360/97.01–97.04, 360/129, 254.4
See application file for complete search history.

(56) References Cited

U.S. PATENT DOCUMENTS

| | | | | | |
|---|---|---|---|---|---|
| 3,938,192 | A | * | 2/1976 | Caletti | 360/133 |
| 4,924,337 | A | * | 5/1990 | Repphun et al. | 360/128 |
| 4,935,830 | A | * | 6/1990 | Hiraoka et al. | 360/128 |
| 5,761,000 | A | * | 6/1998 | Ahn | 360/99.08 |
| 6,002,546 | A | * | 12/1999 | Yagi et al. | 360/97.02 |
| 6,570,741 | B2 | * | 5/2003 | Yamanouchi | 360/254.4 |
| 2002/0141109 | A1 | * | 10/2002 | Nguy | 360/97.02 |
| 2003/0043499 | A1 | * | 3/2003 | Shimomura et al. | 360/97.01 |
| 2005/0225895 | A1 | * | 10/2005 | Nishida et al. | 360/97.01 |

FOREIGN PATENT DOCUMENTS

JP 2003-077266 3/2003

\* cited by examiner

*Primary Examiner*—Andrea L Wellington
*Assistant Examiner*—Matthew G Kayrish
(74) *Attorney, Agent, or Firm*—Townsend and Townsend and Crew LLP; Rambod Nader

(57) ABSTRACT

In a magnetic disk apparatus, a function of shielding a magnetic head is improved while maintaining the form factor with an inexpensive structure. In one embodiment, a magnetic disk apparatus has a magnetic disk, a magnetic head that records or plays back information, a magnetic head support mechanism supporting the magnetic head, a positioning mechanism that moves the magnetic head in a radial direction of the magnetic disk to place the head in position, an enclosure made of a nonmagnetic material, and a shield member made of a magnetic material. The magnetic disk, magnetic head, magnetic head support mechanism, positioning mechanism, and shield member are housed in the enclosure. The shield member has an upper shield located above the magnetic head and extending over the range of movement of the magnetic head, a lower shield located on the opposite side of the surface where the magnetic head exists and extending over the range of movement of the magnetic head, and a connecting portion connecting an outer side end portion of the upper shield and an outer side end portion of the lower shield near the outer fringes of the magnetic disk.

8 Claims, 9 Drawing Sheets

Fig. 1 1 A
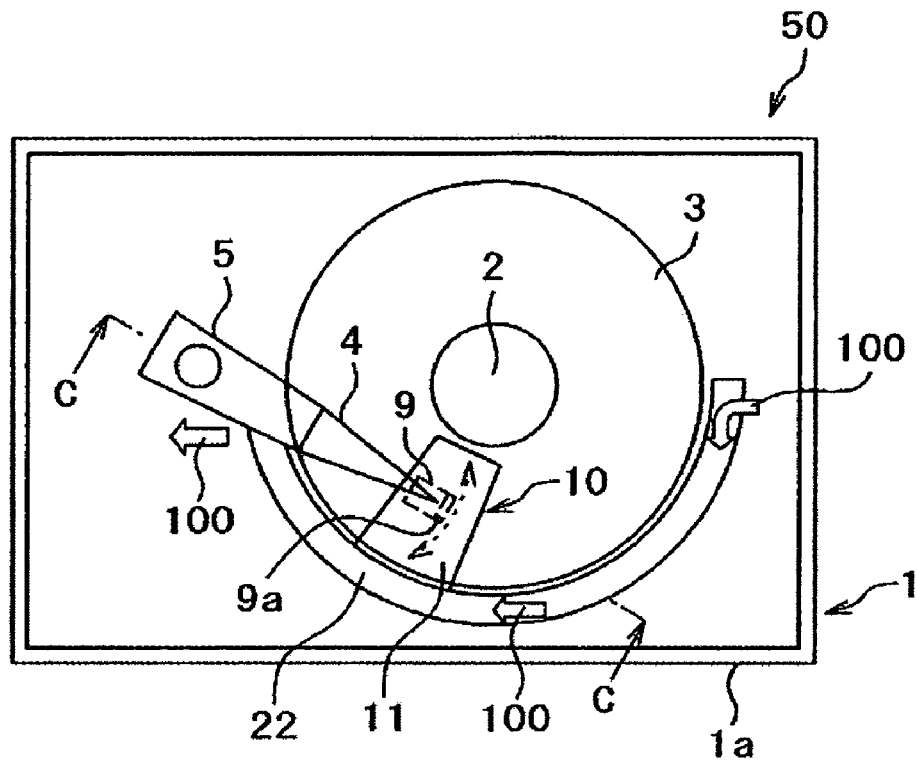
Fig. 1 1 B
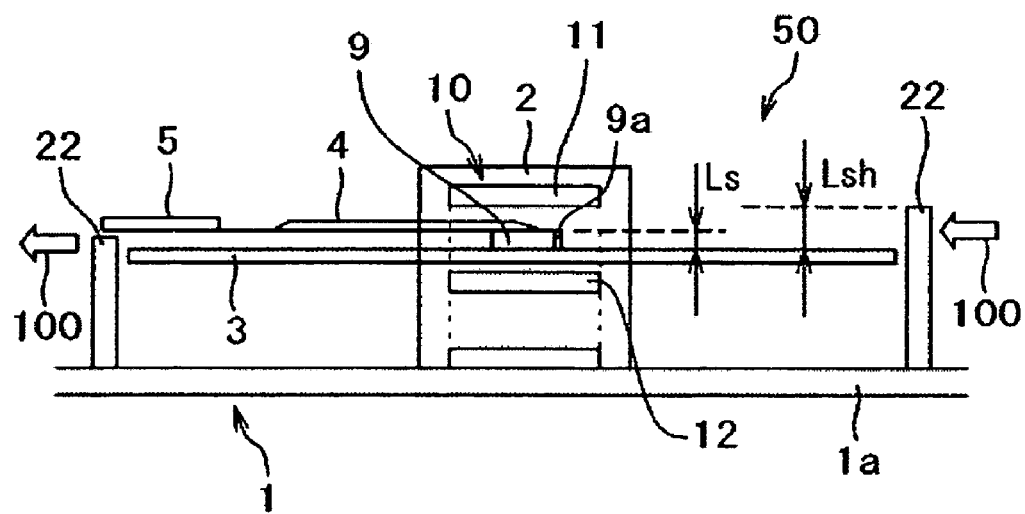

MAGNETIC DISK APPARATUS WITH SHIELD FOR MAGNETIC HEAD

CROSS-REFERENCES TO RELATED APPLICATIONS

This application claims priority from Japanese Patent Application No. JP 2004-263305, filed Sep. 10, 2004, the entire disclosure of which is incorporated herein by reference.

BACKGROUND OF THE INVENTION

The present invention relates to a magnetic disk apparatus and is especially adapted for a magnetic disk apparatus that records information on a magnetic disk by a vertical magnetic recording method.

In a magnetic disk apparatus adopting a vertical magnetic recording method, in a case where a magnetic field is applied from the outside, there is the possibility that the following problem takes place. An external magnetic field is concentrated in the main magnetic pole by the magnetic head and data recorded on the disk is destroyed because of the structure of the magnetic head. Since it is impossible to weaken the strength itself of the external stray magnetic field applied to the magnetic disk apparatus, it is necessary to impart a function of producing a shielding effect (weakening the strength of the external magnetic field) against the external magnetic field to the magnetic disk apparatus.

Accordingly, one shown in JP-A-2003-77266 (Patent Reference 1) has been devised as a conventional magnetic disk apparatus. The magnetic disk apparatus of this Patent Reference 1 is constructed to consist of a magnetic disk of a rotary disk type for recording information by a vertical magnetic recording method, a magnetic head for recording information on the magnetic disk or playing back information from the magnetic disk, a disk drive mechanism that supports movably the magnetic head in a radial direction of the magnetic disk, an enclosure, and a shield member made of a magnetic material for magnetically shielding the magnetic head, the enclosure being made up of a base and a cover.

In an embodiment associated with FIGS. 1-16 of Patent Reference 1, the magnetic disk, magnetic head, and disk drive mechanism are accommodated within the enclosure. The shield member is mounted over the top, lower, and side surfaces of the outside of the enclosure including spaces located above and under the range of movement of the magnetic head (Prior Art 1).

In an embodiment associated with FIG. 17 of Patent Reference 1, magnetic disk, magnetic head, disk drive mechanism, and shield member are accommodated within an enclosure. A shield member is mounted only on the base portion and cover portion which are opposite to the magnetic head (Prior Art 2).

Furthermore, in an embodiment associated with FIG. 18 of Patent Reference 1, magnetic disk, magnetic head, and disk drive mechanism are accommodated within an enclosure. A cutout portion is formed in a part of the enclosure. A shield member is installed in the portion. The front-end side of the shield member extends to both sides of the magnetic disk. Its end surface is positioned oppositely to an end surface of the magnetic head (Prior Art 3).

In addition, in an embodiment associated with FIG. 19 of Patent Reference 1, magnetic disk, magnetic head, and disk drive mechanism are accommodated within an enclosure. A recessed portion is formed in the outer surface of the enclosure. A shield member is installed in the recessed portion. The front-end side of the shield member extends to both sides of the magnetic disk. Its end portion is located oppositely to an end portion of the magnetic head (Prior Art 4).

BRIEF SUMMARY OF THE INVENTION

In Prior Art 1, since the shield member is mounted outside the enclosure that is remote from the magnetic head, there is the problem that it is impossible to bring out the shielding function sufficiently. Furthermore, there is the problem that the outside contour dimension is increased by an amount corresponding to the shield member. The sizes of magnetic disk apparatuses of this type are restricted to 2.5 type (mobile type), 3.5 type, and so on. Also, in a case where a magnetic shielding function is imparted, it is important that the size be within a given size (form factor).

Furthermore, in Prior Art 2, the shield member is mounted only on the base portion and cover portion that are opposite to the magnetic head. Therefore, there is the problem that it is impossible to bring out the shielding function sufficiently.

Furthermore, in Prior Art 3 or 4, a cutout or recessed portion is formed in a part of the enclosure. The shield member is installed in the portion. Therefore, it is necessary that an enclosure of a special shape be prepared and that the function of the enclosure be given to the shield member. There is the problem that the cost is increased.

In Prior Arts 1-4, it has been impossible to sufficiently bring out the shielding function against external magnetic field from a lateral direction (side direction) relative to the magnetic head.

It is a feature of the present invention to provide a magnetic disk apparatus which maintains its form factor with an inexpensive structure and which can improve a function of shielding a magnetic head.

In accordance with an embodiment of the present invention, a structure comprises a disk-shaped rotary magnetic disk; a magnetic head that records information on the magnetic disk or plays back information from the magnetic disk; a magnetic head support mechanism that supports the magnetic head; a positioning mechanism that moves the magnetic head in a radial direction of the magnetic disk to place the head in position; an enclosure consisting of a base and a cover made of a nonmagnetic material; and a shield member made of a magnetic material to magnetically shield the magnetic head. The enclosure incorporates therein the magnetic disk, the magnetic head, the magnetic head support mechanism, the positioning mechanism, and the shield member. The shield member has an upper shield located above the magnetic head and extending over a range in which the magnetic head moves, a lower shield located on a side opposite to a plane in which the magnetic head exists and extending over the range in which the magnetic head moves, and a connecting portion connecting an outer side end portion of the upper shield and an outer side end portion of the lower shield near outer fringes of the magnetic disk.

A first aspect of the present invention comprises: a disk-shaped rotary magnetic disk that records information by a vertical magnetic recording method; a magnetic head that records information on the magnetic disk or plays back information from the magnetic disk; a magnetic head support mechanism that supports the magnetic head; a positioning mechanism that moves the magnetic head in a radial direction of the magnetic disk to place the head in position; an enclosure consisting of a base and a cover made of a nonmagnetic material; and a shield member made of a magnetic material to magnetically shield the magnetic head. The enclosure incorporates therein the magnetic disk, the magnetic head, the magnetic head support mechanism, the positioning mechanism, and the shield member. The shield member has an upper shield located above the magnetic head and extending over a range in which the magnetic head moves, a lower shield located on a side opposite to a plane in which the magnetic head exists and extending over the range in which the magnetic head moves, and a connecting portion connecting an outer side end portion of the upper shield and an outer side end portion of the lower shield near outer fringes of the magnetic disk. The upper shield has a roof portion located above the magnetic head and extending over the range in which the magnetic head moves and a step portion located closer to a surface of the magnetic disk than the roof portion and extending over the range in which the magnetic head moves, the roof portion and the step portion being integral.

In the first aspect of the present invention described above, a more preferable specific example of configuration is as follows.

(1) The step portion is placed close to the surface of the magnetic disk so as to be located at a side of an end surface of the magnetic head.

(2) In addition to (1) above, the step portion is made to have a wall thickness greater than that of the roof portion. The connecting portion is connected to the step portion and made to have a wall thickness greater than that of the roof portion.

(3) In addition to (1) above, the step portion is formed to have the same thickness as the roof portion.

A second aspect of the present invention comprises: a disk-shaped rotary magnetic disk that records information by a vertical magnetic recording method; a magnetic head that records information on the magnetic disk or plays back information from the magnetic disk; a magnetic head support mechanism that supports the magnetic head; a positioning mechanism that moves the magnetic head in a radial direction of the magnetic disk to place the head in position; a ramp mounted close to outer fringes of the magnetic disk such that the magnetic head is retracted to the outside of the magnetic disk when rotation of the magnetic disk has stopped; an enclosure consisting of a base and a cover made of a nonmagnetic material; and a shield member made of a magnetic material to magnetically shield the magnetic head. The enclosure incorporates therein the magnetic disk, the magnetic head, the magnetic head support mechanism, the positioning mechanism, and the shield member. The shield member has an upper shield located above the magnetic head and extending over a range in which the magnetic head moves, a lower shield located on a side opposite to a plane in which the magnetic head exists and extending over the range in which the magnetic head moves, and a connecting portion connecting an outer side end portion of the upper shield and an outer side end portion of the lower shield near outer fringes of the magnetic disk. The connecting portion is disposed in a dead space surrounded by side walls of the ramp and the base and by outer fringes of the magnetic disk.

In the second aspect of the present invention described above, a more preferable specific example of configuration is as follows. The upper shield, the lower shield, and the connecting portion are provided with cutout portions in side surfaces corresponding to the ramp. The magnetic head goes into and out of the ramp through the cutout portions.

A third aspect of the present invention comprises: a disk-shaped rotary magnetic disk that records information by a vertical magnetic recording method; a magnetic head that records information on the magnetic disk or plays back information from the magnetic disk; a magnetic head support mechanism that supports the magnetic head; a positioning mechanism that moves the magnetic head in a radial direction of the magnetic disk to place the head in position; an enclosure consisting of a base and a cover made of a nonmagnetic material; and a shield member made of a magnetic material to magnetically shield the magnetic head. The enclosure incorporates therein the magnetic disk, the magnetic head, the magnetic head support mechanism, and the shield member. The shield member has an upper shield located above the magnetic head and extending over a range in which the magnetic head moves, a lower shield located on a side opposite to a plane in which the magnetic head exists and extending over the range in which the magnetic head moves, and a connecting portion connecting an outer side end portion of the upper shield and an outer side end portion of the lower shield near outer fringes of the magnetic disk. The connecting portion acts also as a shroud member extending peripherally near outer fringes of the magnetic disk.

In the third aspect of the present invention described above, a more preferable specific example of configuration is as follows. A spindle mechanism for rotating the magnetic disk is fitted in a central portion, and the shroud member extends half round the magnetic head.

A fourth aspect of the present invention comprises: a disk-shaped rotary magnetic disk that records information by a vertical magnetic recording method; a spindle mechanism that supports and rotates the magnetic disk; a magnetic head that records information on the magnetic disk or plays back information from the magnetic disk; a magnetic head support mechanism that supports the magnetic head; a positioning mechanism that moves the magnetic head in a radial direction of the magnetic disk to place the head in position; an enclosure consisting of a base and a cover made of a nonmagnetic material; and a shield member made of a magnetic material to magnetically shield the magnetic head. The enclosure incorporates therein the magnetic disk, the magnetic head, the magnetic head support mechanism, the positioning mechanism, and the shield member. The shield member consists of a shield disk located above the magnetic head, a thin film of magnetic material coated on a lower surface side of the magnetic disk, and a part of the spindle mechanism that connects the shield disk and the thin film of magnetic material.

According to the present invention, it is-possible to obtain a magnetic disk apparatus which protects its form factor with an inexpensive structure and which can improve the function of shielding a magnetic head.

BRIEF DESCRIPTION OF THE DRAWINGS

FIG. 10 is a cross-sectional view of main portions of a magnetic disk apparatus of a second embodiment of the present invention.

FIG. 11A is a plan view of a magnetic disk apparatus of a third embodiment of the present invention.

FIG. 11B is a cross-sectional view on C-C of FIG. 11A.

DETAILED DESCRIPTION OF THE INVENTION

Plural embodiments of the present invention are hereinafter described using the figures. Identical symbols in the figures of the embodiments indicate the same or corresponding objects. Note that more effective ones can be made by appropriately combining the embodiments according to the need.

First Embodiment

Figure 1:
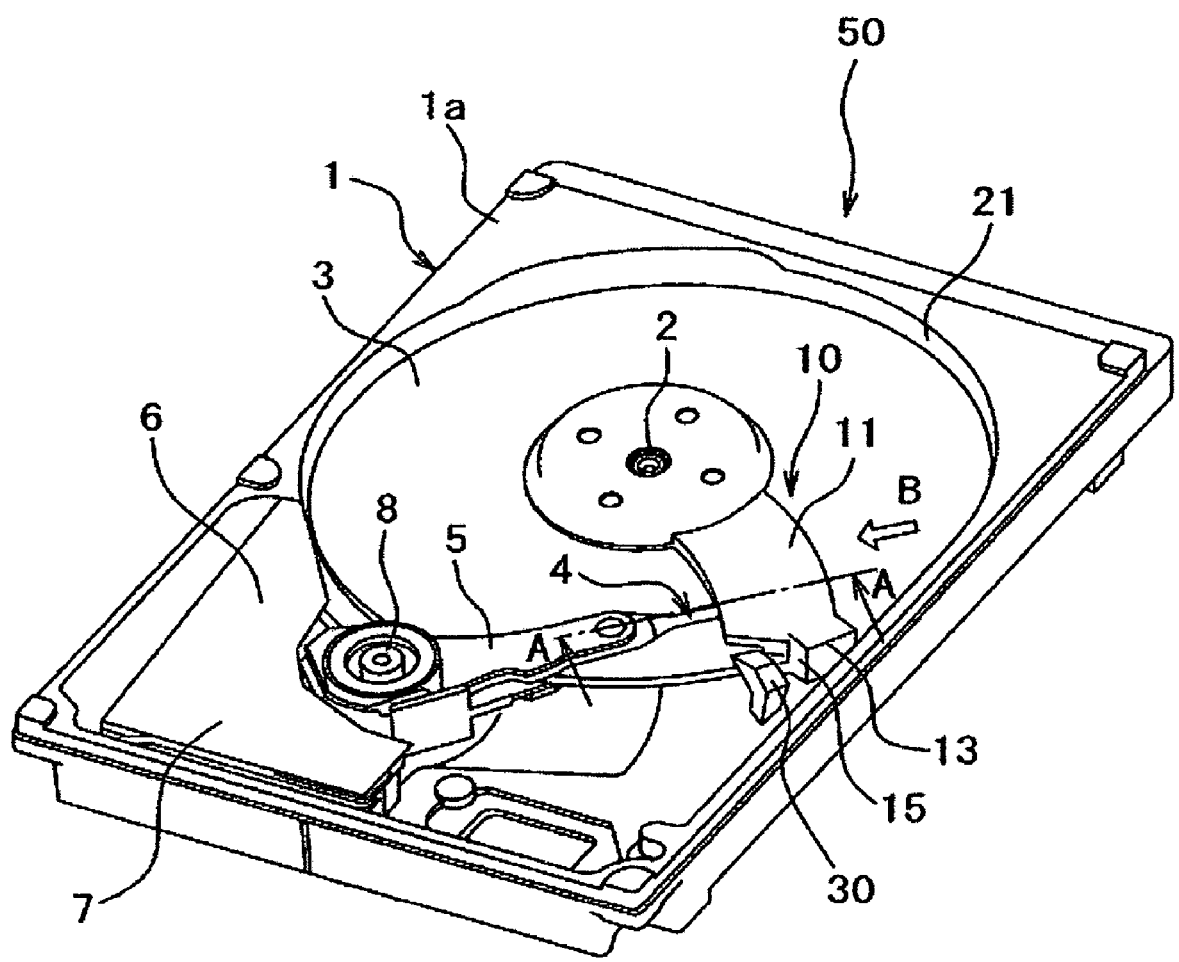
FIG. 1 is a perspective view of a magnetic disk apparatus of a first embodiment of the present invention.
Figure 2:
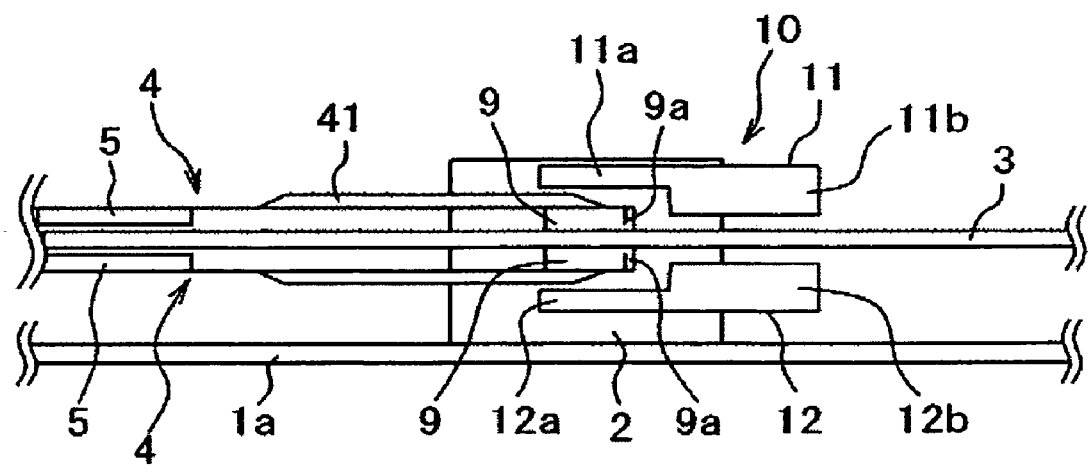
FIG. 2 is a cross-sectional view on A-A of FIG. 1.
Figure 3:
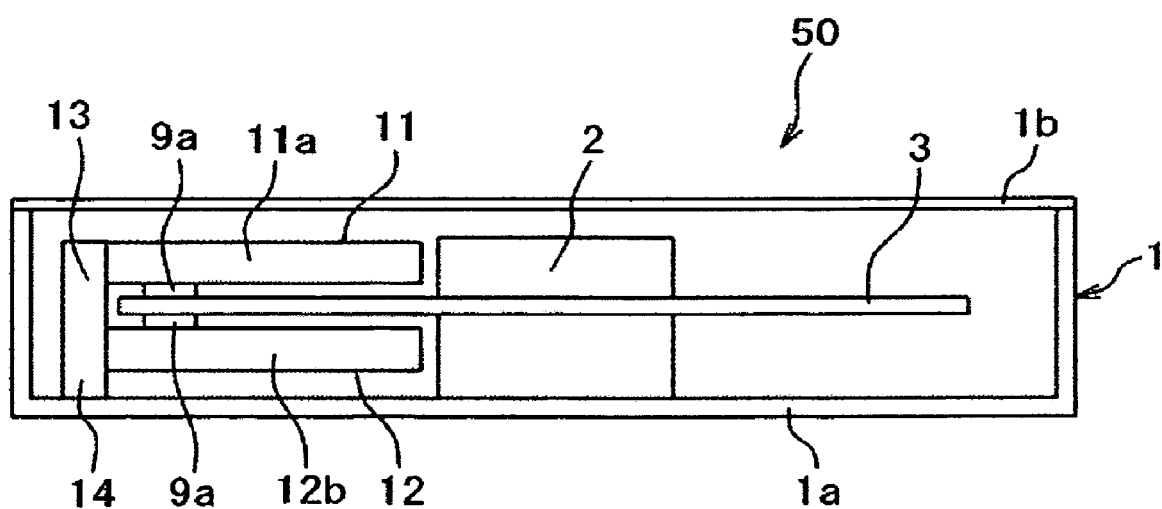
FIG. 3 is a cross-sectional view as viewed from B direction of FIG. 1.

A magnetic disk apparatus of a first embodiment of the present invention is described using FIGS. 1 to 8. The whole of a magnetic disk apparatus 50 of the present embodiment is described with reference to FIGS. 1 to 3. FIG. 1 is a perspective view of the magnetic disk apparatus 50 of the present embodiment. FIG. 2 is a cross-sectional view on A-A of FIG. 1. FIG. 3 is a cross-sectional view as viewed from B direction of FIG. 1. Note that the magnetic disk apparatus 50 of FIG. 1 is shown in a state where the cover 1b of the enclosure 1 has been removed.

The magnetic disk apparatus 50 has a spindle mechanism 2, a magnetic disk 3, a magnetic head support mechanism 4, a positioning mechanism 6, a shield member 10, and a ramp 30 which are enclosed and housed within the enclosure 1.

The enclosure 1 is made up of a lunch-box type base 1a and a cover 1b that plugs up the upper surface opening in the base 1a. The base 1a and cover 1b have the same structure as the enclosure of a general magnetic disk apparatus and are made of a nonmagnetic material (e.g., aluminum). The base 1a forms a shroud surface 21 accommodating the magnetic disk 3. This shroud surface 21 is a cylindrical surface whose total periphery is partially cut out. A magnetic head slider 9 and the magnetic head support mechanism 4 go into and out of the disk surface side through the cutout portion.

The spindle mechanism 2 is intended to rotate the magnetic disk 3, is mounted to a central portion of the bottom surface of the base 1a, and is made up of a drive portion and a rotating portion.

The magnetic disk 3 consists of a disk-shaped rotary magnetic disk that records information on annular tracks by a vertical magnetic recording method. The disk is fixed to the rotating shaft portion of the spindle mechanism 2 and rotated at a high speed. The annular tracks are multiple in number and extend from the inner surface to the outer surface of the magnetic disk 3. A magnetic head 9a that is a device portion is moved to each track and placed in position such that a recording or playback operation is performed. The magnetic disk 3 is single in number. One magnetic head 9a is installed on each of the front surface side (cover side) of the magnetic disk 3 and the rear surface side (base side). In the present embodiment, the magnetic disk 3 has an outside diameter of 65 mm and an inside diameter of 24 mm, and is a magnetic disk apparatus having such a size that it is generally known as a 2.5 type magnetic disk apparatus.

The magnetic head support mechanism 4 is intended to support the magnetic head 9a that records information on the magnetic disk 3 or plays back information from the magnetic disk 3. As shown in FIG. 2, the mechanism is made up of the magnetic head slider 9 and a suspension 41. The magnetic head 9a is carried on the slider, which floats over the magnetic disk 3. The magnetic head slider 9 is supported to the front-end side of the suspension.

The magnetic head slider 9 is so constructed that the magnetic head 9a is installed to the front-end side and that the slider is floated from the disk surface by an air stream created as a result of rotation of the magnetic disk 3. The magnetic head slider 9 (magnetic head 9a) is supported movably in a radial direction of the magnetic disk 3. Also, the suspension 41 provides a pivot support of the magnetic head slider 9 such that motion of the slider is not restricted. The suspension gives a pressing load that presses the magnetic head slider 9 against the disk surface to the magnetic head slider 9. The base side (i.e., the base side of the magnetic head support mechanism 4) of the suspension 41 is connected to an arm 5.

In the present embodiment, the magnetic head support mechanism 4 is mounted on both sides of the magnetic disk 3. It may also be mounted only on one side of the magnetic disk 3.

The positioning mechanism 6 is constructed such that it is made up of the arm 5, a voice coil motor 7, and a pivot bearing 8. The arm 5 is rotated (swung) about the pivot bearing 8 by the voice coil motor 7 to place the magnetic head 9a in position over a desired track on the magnetic disk 3.

A ramp 30 is intended to retract the magnetic head 9a out of the magnetic disk 3 during stop of rotation of the magnetic disk 3 (during unloading). The ramp is mounted in the position of the cutout portion in the shroud 21 near the outer fringes of the magnetic disk 3. During the retraction, a tab 42 (see FIG. 4) mounted at the front end of the magnetic head support mechanism 4 makes contact with the ramp 30 and slides upward. As a result, the magnetic head 9a is also peeled off from the surface of the magnetic disk 3. Also, when rotation of the magnetic disk 3 is started (during loading), the tab 42 of the magnetic head support mechanism 4 retracted to the outside of the magnetic disk 3 slides down the ramp 30 in a reverse manner. Thus, the magnetic head 9a is lowered to the disk surface. This mechanism is used widely in 2.5 type magnetic disk apparatus and so on, and is known as a loading/unloading mechanism. To mount the ramp 30 near the outer fringes of the magnetic disk 3, the upper shield 11, lower shield 12, and connecting portion 13 are partially cut out, and a cutout portion 15 is formed in the shield member 10.

Figure 4:
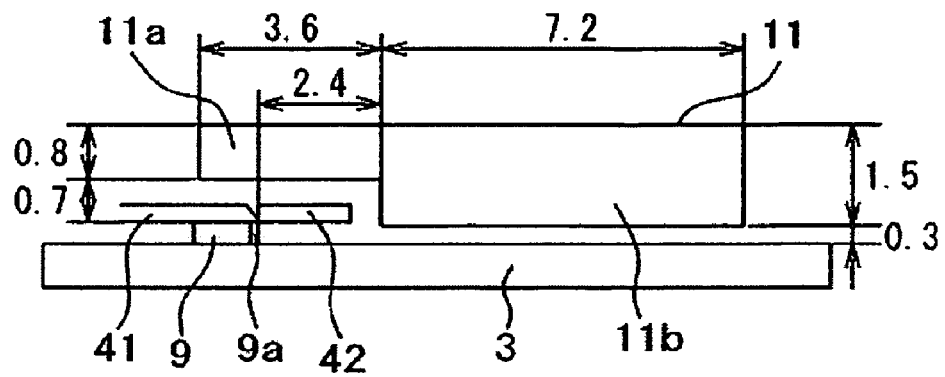
FIG. 4 is an enlarged view of main portions of FIG. 2.
Figure 5:
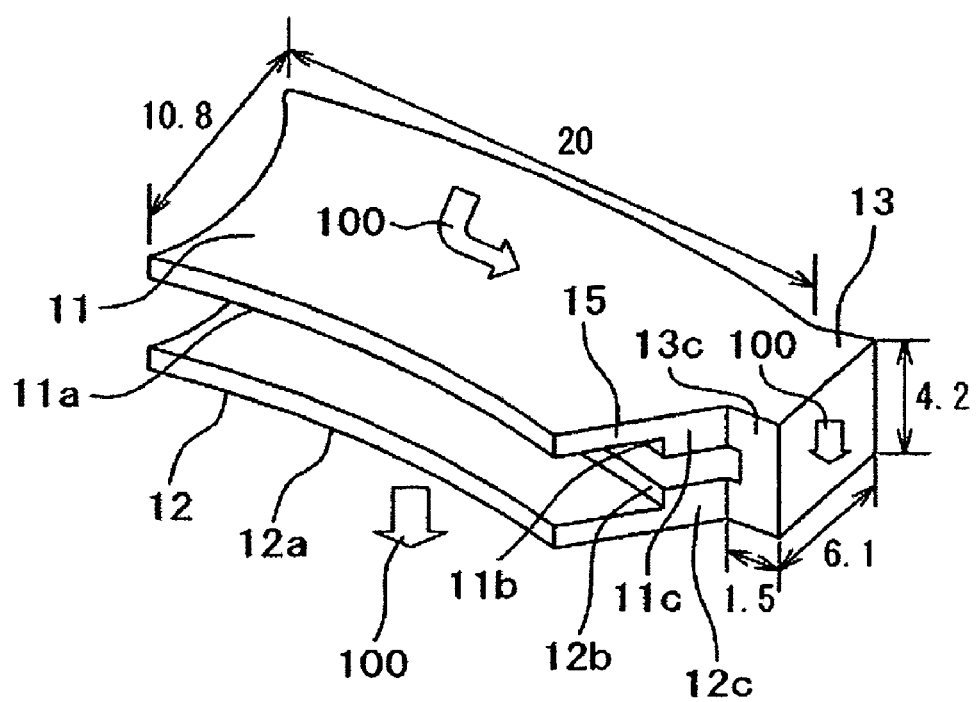
FIG. 5 is a fragmentary enlarged perspective view of the shield member of FIG. 2, and in which the member is in an isolated state.

Then, the shield member 10 is described with reference to FIGS. 1-5. FIG. 4 is an enlarged view of main portions of FIG. 2. FIG. 5 is an enlarged perspective view of a part of the shield member 10 of FIG. 2 when the member is in an isolated state. In FIGS. 4 and 5, the dimensions of various portions are also shown.

The shield member 10 is made of a magnetic material to magnetically shield the magnetic head 9a. This shield member 10 is constructed such that it comprises an upper shield 11 located above the magnetic head 9a and extending over a range of movement of the magnetic head 9a, a lower shield 12 located on a side opposite to the surface where the magnetic head 9a exists and extending over the range of movement of the magnetic head 9a, a connecting portion 13 connecting an outer side end portion of the upper shield 11 and an outer side end portion of the lower shield 12 near the outer fringes of the magnetic disk 3, and a mounting portion 14 mounted to the inner surface of the base 1a, it being noted that these components are integral. In this integral structure, the various components may be made of one member. Alternatively, the various components may be made of separate members and firmly mounted together. The shield member 10 is shaped like the letter U when viewed from a side. The upper and lower shields 11 and 12 are mounted such that the magnetic disk 3 is sandwiched between them.

The upper shield 11 is constructed such that it comprises a roof portion 11a located above the magnetic head 9a on the upper side of the disk and extending over the range of movement of the magnetic head 9a and a step portion 11b located closer to the disk surface than the roof portion 11a and extending over the range of movement of the magnetic head 9a, it being noted that the roof portion and step portion are integral. The lower shield 12 is constructed such that it comprises a roof portion 12a located under the magnetic head 9a on the lower side of the disk and extending over the range of movement of the magnetic head 9a, and a step portion 12b located closer to the disk surface than the roof portion 12a and extending over the range of movement of the magnetic head 9a. The roof portion 12a and step portion 12b are integral.

In particular, the step portion 11b is made to have a wall thickness greater than that of the roof portion 11a. The cross-sectional shape of the upper shield 11 is shaped like the letter L. Making the shape like the letter L makes it possible to mount the shield member 10 close to the magnetic head 9a mounted on the end surface of the magnetic head slider 9. The purpose is to increase the effect of shielding against external magnetic field. In other words, the roof portion 11a is mounted on the mounting side of the suspension 41 of the magnetic head slider 9. A step portion 11b close to the disk surface is mounted so as to cover the magnetic head 9a on the rear-end side of the magnetic head slider 9. The step portion 11b makes it possible to increase the effect of shielding against external magnetic field, especially from a lateral direction. Furthermore, by making the step portion 11b have a large wall thickness, the magnetic path resistance of the step portion 11b can be reduced. Consequently, magnetic flux applied to the roof portion 11a can be guided to the connecting portion 13 through the step portion 11b having a small magnetic path resistance. From this respect, too, the shielding effect can be increased.

The structure of the lower shield 12 is also identical in shape with the upper shield 11, and is made up of roof portion 11a and step portion 11b. The step portion 11b extends toward the surface of the disk 3 so as to cover the magnetic head 9a. In this way, the lower shield 12 performs the same functions as the upper shield 11 and so repeated description is omitted.

The upper shield 11 and lower shield 12 extend from the inner surface to the outer surface of the magnetic disk 3, and are connected near the end surface on the side of the disk outer surface by the connecting portion 13. As shown in FIG. 3, the upper shield 11 is positioned such that the magnetic head 9a of the magnetic head slider 9 is seen from the gap between the step shield 11a and magnetic disk 3.

The connecting portion 13 is connected to the thick-walled step portion 11b and made to have a wall thickness greater than that of the roof portion 11a. Consequently, the magnetic path resistance of the connecting portion 13 can be reduced. Therefore, magnetic flux applied to the upper shield 11 or lower shield 12 can be guided to the upper shield 11 or lower shield 12 through the connecting portion 13 of low magnetic path resistance. From this respect, too, the shielding effect can be enhanced. Also, the connecting portion 13 is positioned in a dead space surrounded by the ramp 30, side wall of the base 1a, and outer fringes of the magnetic disk 3. In consequence, the shield member 10 can be accommodated within the enclosure 1 while maintaining the form factor of the magnetic disk apparatus 50.

A mounting portion 14 for the base 1a is protrusively mounted to the base side of the connecting portion 13. In the present embodiment, the mounting portion 14 is mounted to the connecting portion 13. This mounting portion 14 may be eliminated, and the lower shield 12 may be directly mounted to the base 1a. By adopting this structure, the height (thickness) of the magnetic disk apparatus 50 can be reduced, achieving a miniaturization. Also, a higher shielding effect can be obtained by increasing the thickness of the lower shield 12.

The front end of the roof portion 11a of the upper shield 11 extends to over the magnetic head slider 9 as shown in FIG. 4, and is connected to the step portion 11b behind the magnetic head slider 9. The surface of the step portion 11b opposite to the magnetic disk extends to the disk surface.

The length (3.6 mm) of the upper roof portion 11a is greater than the sum of the length of the loading/unloading tab 42 mounted at the front end of the suspension 41 and the length of the magnetic head slider 9. The length is so set that if the upper portion of the magnetic head slider 9 is fully covered by the upper roof portion 11a, the tab 42 does not strike the step portion 11b.

Furthermore, the distance (0.7 mm) between the roof portion 11a (surface opposite to the suspension) and the back surface of the magnetic head slider 9 (suspension mounting surface) is set to a dimension that is required to prevent the suspension 4 from striking the roof portion 11a. Also, the thickness (0.8 mm) of the roof portion 11a and the thickness (1.5 mm) of the step portion 11b are such thicknesses that the roof portion is accommodated within the 2.5 type magnetic disk apparatus without touching the cover 1b. In addition, the thicknesses are set as large as possible to enhance the shielding effect. The distance (0.3 mm) between the step portion 11b and the disk surface is greater than the distance that the magnetic head slider 9 floats from the disk surface to prevent the magnetic disk 3 from coming into contact with the step portion 11b if the disk 3 is deformed by external shock. In the present embodiment, it is assumed that the size of the magnetic head slider 9 is a so-called pico-sized (1.25 mm×1 mm×0.3 mm) slider. However, the present invention can also be applied to a slider of arbitrary size.

The length (7.2 mm) of the step portion 11b is set to such a dimension that a space for mounting the connecting portion 13 on the end surface of the step portion 11b is secured and that rigidity of the upper shield 11 can be secured as shown in FIG. 5. Also, a side surface 13c of the connecting portion 13, a side surface 11c of the upper shield 11, and a side surface 12c of the lower shield are configured to form a cutout portion 15 (see FIG. 1) when viewed from a flat plane. This cutout portion 15 is intended to secure the functions of the portions 11, 12, and 13 of the shield member 10 and to permit the loading/unloading ramp 30 to extend to over the disk surface. This cutout portion 15 can circumvent contact between the ramp 30 and shield member 10. The positional relations among the shield member 10, magnetic head support mechanism 4, magnetic disk 3, and loading/unloading ramp 30 are as shown in FIG. 1. That is, the shield member 10 has an open structure in which the sides of the connecting portion 13 on the magnetic head slider side, upper shield 11, and magnetic head side on the outer side of the lower shield 12 are cut out. The member is located close to the ramp 30.

The shielding effect in the shield member 10 of the present embodiment is next described with reference to FIGS. 6A and 6B. FIG. 6A is an explanatory view of a model with a step. FIG. 6B is a characteristic diagram showing a shielding effect owing to the stepped model.

The stepped model is of the same structure as the shield member 10 of the present embodiment, and consists of an upper shield 11 having a roof portion 11a and a step portion 11b, a lower shield 12 having a roof portion 12a and a step portion 12b, and a connecting portion 13 connecting them. A calculation using the stepped model was performed over the whole shield member 10. Since the upper shield 11 and lower shield 12 have a symmetrical structure, only calculation meshes on each surface of the upper shield 11, upper portion of the connecting portion 13, and magnetic disk 3 are shown in FIG. 6A.

In this stepped model, the magnetic field strength at a magnetic head position in a case where an external magnetic field was applied perpendicularly to the surface of the magnetic disk 3 was calculated. The strength of the external magnetic field was set to 300 gauss. The sense of the magnetic flux was set to be perpendicular to the disk surface. The sense was set perpendicular to the disk surface because this was a direction in which the effect on the recording surface was greatest. The results of the calculation are shown in FIG. 6B. FIG. 6B shows a relation between a disk radial position of the magnetic head 9a and the magnetic field strength. The upper shield 11 extends from 13 mm to 29 mm in terms of the radial position of the disk. In a region with radial positions of 30 mm or more, the shield member 10 is not present. As heights from the surface of the magnetic disk 3, calculations were performed at positions of 0.15 mm and 0.3 mm from the disk surface. Generally, the height of the magnetic head 9a of the magnetic head slider 9 is 0.3 mm. The positions were selected to evaluate the effects at the same height as that height and at a height half that height.

As is obvious from FIG. 6B, the strength was reduced down to about 100 gauss on the inner side of the magnetic disk 3 by the shield member 10 of the stepped model although the external magnetic field was 300 gauss. Also, the strength was reduced to about 70 gauss on the external side. Little variations of the height from the disk surface were observed. In this way, according to the present embodiment, the strength of the external magnetic field can be reduced to about one third or less at the position of the magnetic head.

When the radial position is 30 mm or more, the magnetic field strength increases suddenly, because the field is outside the upper shield 11, i.e., the shielding effect is reduced by the cutout portion 15. Here, radial positions of 30 mm or more are not used as the magnetic recording area and so no problems take place. If it is desired to use a wider range (outer periphery), the cutout portion should be reduced or otherwise be coped with.

Fundamentally, the shield member 10 may be made of any material as long as it is a magnetic material. In the present example of calculation, iron (SPCC) used in the voice coil motor 7 is assumed. Calculations were performed using its physical property values. At that time, the saturation magnetic flux density was set to 2.2 Tesla (T). Other usable materials include corrosion-resistant stainless (such as SUS430). Where iron is used, it is desired to form coating to prevent corrosion and dust generation. In particular, this is mounted inside the magnetic disk apparatus 50. Because of rust and generation of dust, it is bitten in between the magnetic head slider 9 and the magnetic disk 3, thus preventing deterioration of the floating characteristics of the magnetic head slider 9.

The mechanism of the shielding effect of the embodiment is next described with reference to FIG. 5. Where the external magnetic field perpendicular to the disk surface is a magnetic field flowing from above the disk surface downwardly, for example, magnetic flux 100 is concentrated in the upper shield 11 as shown in a conceptual view of the flow in FIG. 5. The flux flows into the lower shield 12 via the connecting portion 13, and is returned to the outside from the lower shield 12. As is obvious from this, the magnetic flux of the external magnetic field flows so as to avoid the magnetic head 3 inserted in the shield member 10. Therefore, the magnetic field is concentrated in the magnetic head 9a for vertical recording. Malfunction such as erasure of information on the disk surface or writing of erroneous data into the disk surface can be prevented. Where the external magnetic field perpendicular to the disk surface flows from below the disk surface upwardly, the magnetic flux flows into the shield member 10 in a reverse manner. A similar shielding effect is exhibited.

Figure 6:
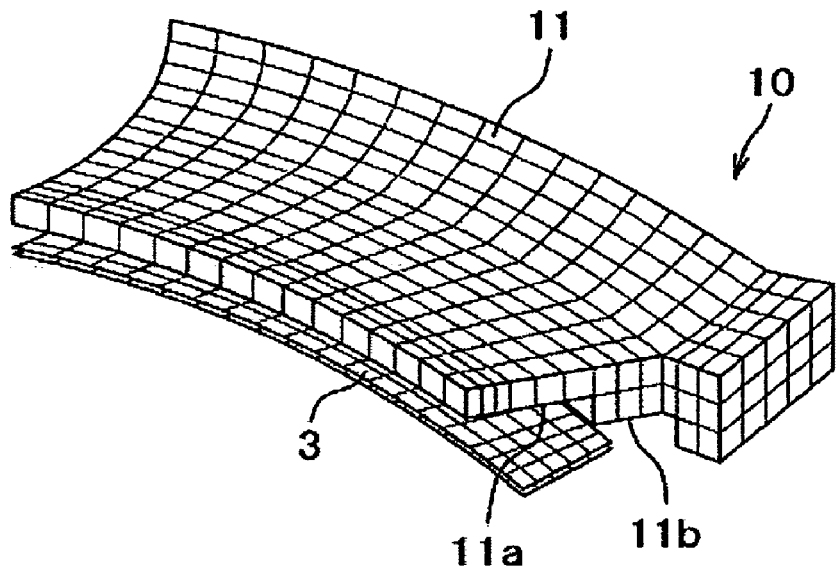
FIG. 6A is an explanatory view of a stepped model in the first embodiment.
FIG. 6B is a characteristic diagram showing a shielding effect owing to the stepped model.
Figure 6:
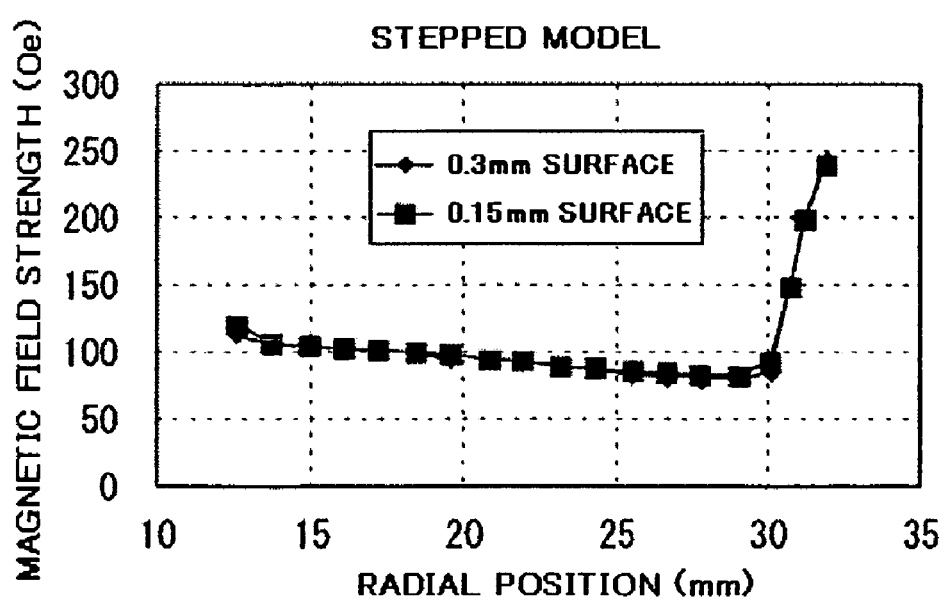
Figure 7:
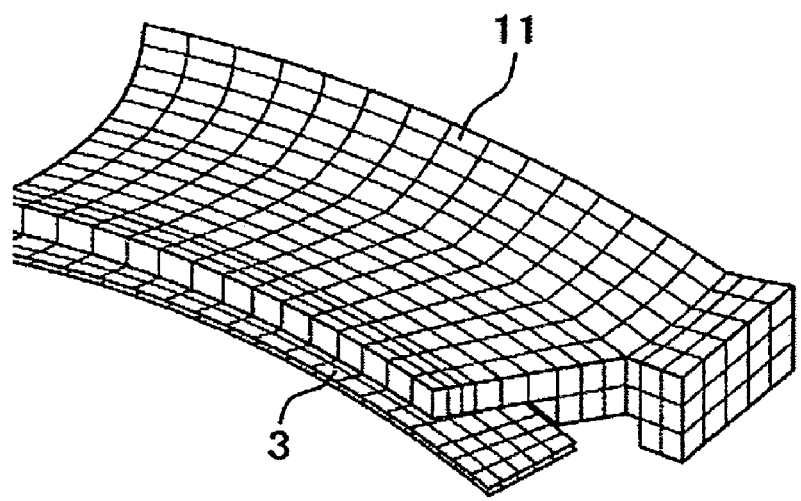
FIG. 7A is an explanatory view of a stepless model that is a modified example of the first embodiment.
FIG. 7B is a characteristic diagram showing a shielding effect owing to the stepless model.
Figure 7:
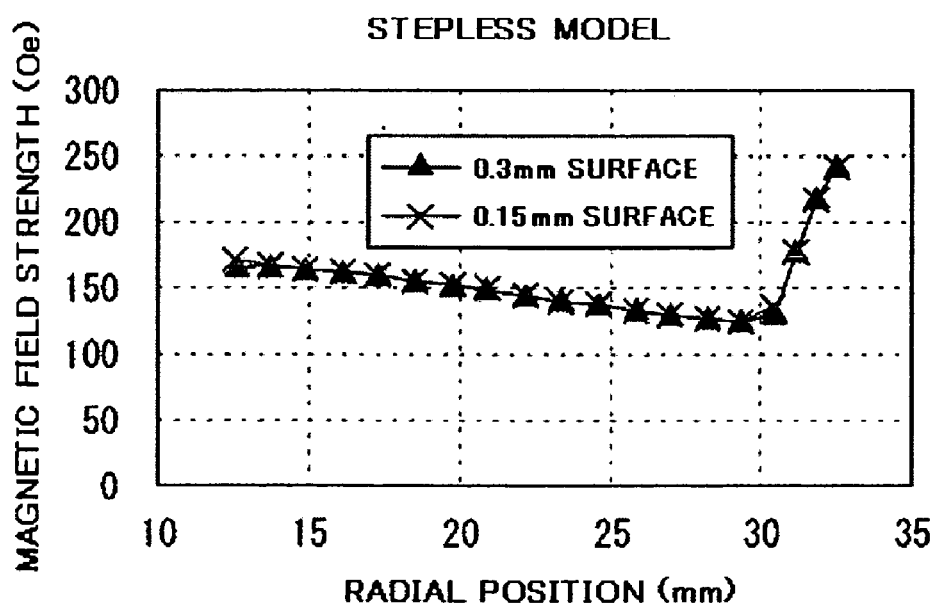

The shielding effect in a case of a shield member having no step but having the same outside dimension as the stepped shield member of FIG. 6 is next described with reference to FIGS. 7A and 7B. FIG. 7A is an explanatory view of a model having no step. FIG. 7B is a characteristic diagram showing the shielding effect owing to the model having no step. The shield member 10 of FIG. 7 has no step portion unlike the shield member 10 of FIG. 6. An upper shield 11 having the same thickness as the roof portion 11a is fabricated in the same size as the upper shield 11 of the shield member 10 of FIG. 6. A lower shield 12 is also fabricated similarly. Calculational conditions are the same as those of FIG. 6.

As is obvious from FIG. 7B, in the stepless shield member 10, the magnetic field strength is about 160 gauss at the inner surface of the disk and about 130 gauss at the outer surface. It can be seen from this that even the stepless shield member 10 can reduce the external magnetic field by about 50% to 60%. It can be seen from this point of view that the present invention is effective if there is no step portion. However, provision of a step portion makes the shielding effect more effective.

Figure 8:
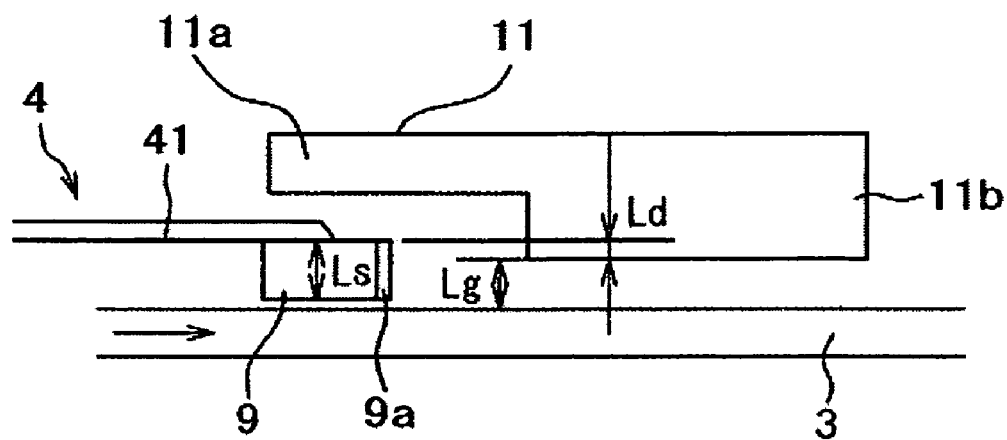
FIG. 8 is an explanatory view showing an example of modification of the shield member of the first embodiment.
Figure 9:
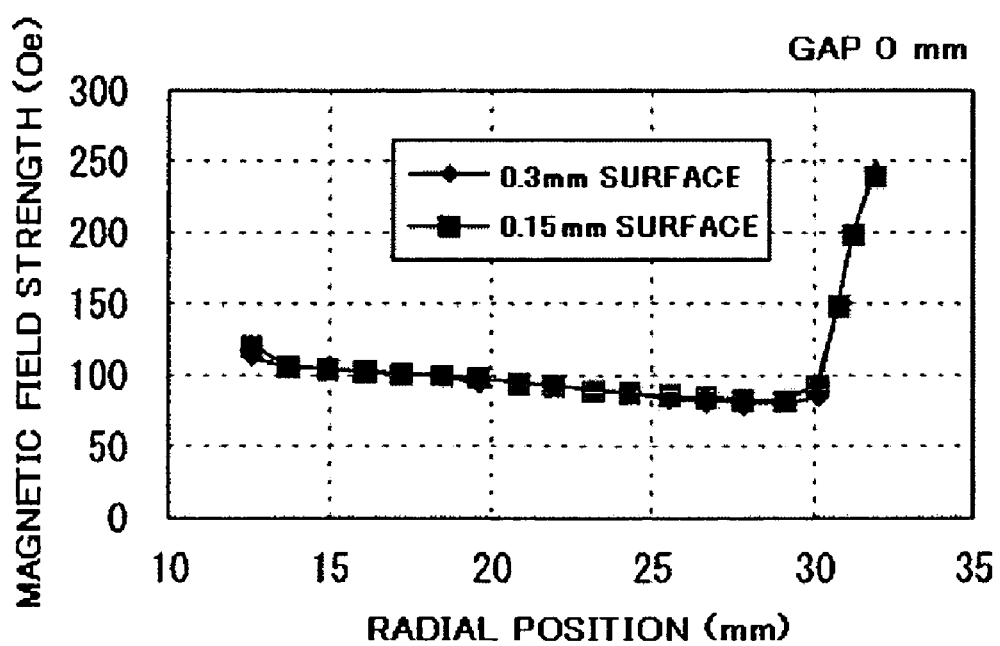
FIG. 9A is a characteristic diagram showing a shielding effect owing to the shield member of FIG. 8.
FIG. 9B is a characteristic diagram showing shielding effects owing to the shield member of FIG. 8 at different installation distances.
Figure 9:
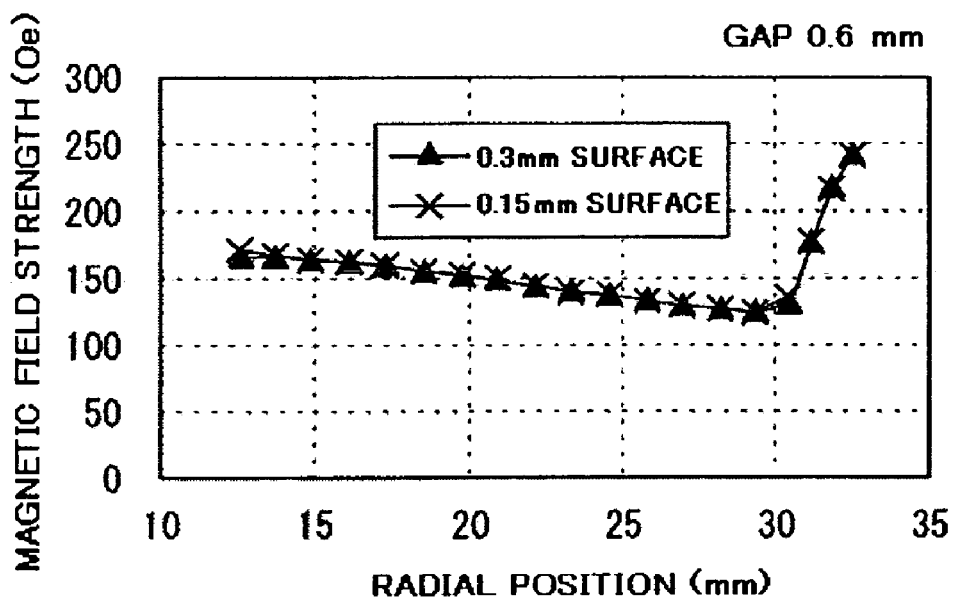
Figure 1:
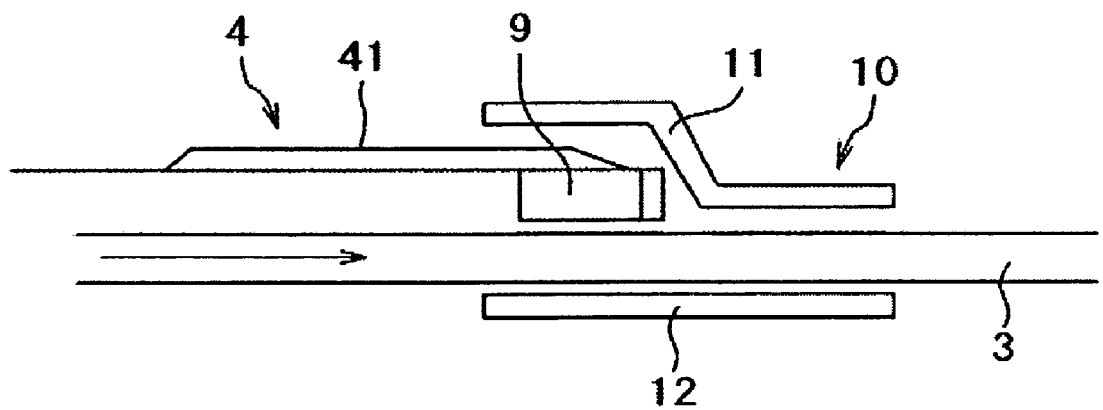

A shield member 10 which has shortened the distance between the step portion 11b of the upper shield 11 and the disk surface is next described with reference to FIGS. 8 and 9. FIG. 8 is an explanatory view of a modified example of the shield member 10 of the present embodiment. FIG. 9 is a characteristic diagram showing the shielding effect owing to the shield member 10 of FIG. 8. FIG. 9A is a characteristic diagram in a case where the distance Lg is 0 mm. FIG. 9B is a characteristic diagram in a case where the distance Lg is 0.6 mm.

The shield member 10 shown in FIG. 8 is placed close to the disk surface such that the distance Lg between the step portion 11b and the disk surface is smaller than the thickness Ls of the magnetic head slider 9 and that the step portion 11b is located at a side of the magnetic head end surface. That is, the relation of the following formula (1) is established.

$$Ls-Lg=Ld>0 \qquad (1)$$

In the upper shield 11 of FIGS. 4 and 6, the distance Lg between the step portion 11b and the disk surface is 0.3 mm, which is the same as the thickness Ls of 0.3 mm of the magnetic head slider 9. It cannot be said that the step portion 11b is close to the disk surface up to a side of the magnetic head end surface.

As shown in FIG. 8, a magnetic head device 9a is mounted at an end surface (surface perpendicular to the disk surface) of the magnetic head slider 9 and so the magnetic head device portion 9a is surrounded more as the distance Lg between the step portion 11b and the disk surface is reduced, increasing the shielding effect. Also, for an external magnetic field incident obliquely to the disk surface or an external magnetic field incident at an angle almost parallel to the disk surface, the magnetic flux less strikes the magnetic head device portion directly. Therefore, an improvement of the shielding effect can be expected. For this reason, malfunction in recording and playback with a more intense oblique magnetic field or parallel magnetic field occurs less frequently. The reliability of the apparatus can be improved. On the other hand, if the distance Lg is too small, there is the possibility that an external shock deforms the magnetic disk 3, which in turn makes contact with the step portion 11*b*. Therefore, it is necessary to secure appropriate distance Lg in a corresponding manner to the magnitude of the external shock.

Calculated magnetic field strengths in cases where the distance Lg is 0 mm and 0.6 mm are shown in FIG. 9. Where the distance Lg is 0 mm, i.e., the step portion 11*b* is made to extend to the disk surface, the external magnetic field can be improved by about 30% compared with the case where the distance Lg is 0.3 mm (in the case of FIGS. 4 and 6). On the other hand, where the distance Lg is set to 0.6 mm, the field deteriorates by about 20% compared with the case where the distance Lg is 0.3 mm. Therefore, the step portion 11*b* is preferably placed closer to the disk surface with a view to improving the shielding effect.

As described so far, in the present embodiment, an external magnetic field incident perpendicularly to the disk surface can be reduced greatly. Therefore, even in a magnetic disk apparatus 50 of the vertical recording system, malfunction in recording and playback due to external magnetic field does not take place. The highly reliable, high recording density (large capacity) magnetic disk apparatus 50 can be accomplished. Furthermore, in the present embodiment, the shield member 10 is mounted in the magnetic disk apparatus 50 without modifying main constituent members such as cover 1*b* and base 1*a*. Therefore, the shield member 10 is mounted while maintaining the form factor. A decrease in the productivity (cost increase) due to increased size of the apparatus or exchange of parts is prevented. With respect to the shape of the shielding member 10, if the step is formed so as to surround the magnetic head 10*a* (such that it protrudes to the magnetic disk surface), the shielding effect can be improved remarkably. Also, improvement of the shielding effect against a magnetic field incident obliquely or parallel to the disk surface can be anticipated.

Second Embodiment

A second embodiment of the present invention is next described using FIG. 10. FIG. 10 is a cross-sectional view of main portions of a magnetic disk apparatus of the second embodiment of the present invention. This second embodiment differs from the first embodiment in the respects described in the following. In the other respects, the second embodiment is fundamentally the same as the first embodiment.

The differences between this second embodiment and the first embodiment are (i) only one magnetic head 9 is on the top surface of the magnetic disk 3, (ii) the shield member 10 is stamped out of a single metal sheet or plate, and (iii) the lower shield 12 is mounted parallel to the disk surface. In the same way as in the first embodiment, the lower shield 12 may be directly mounted to the base 1*a*. This facilitates machining the shield member 10. The productivity can be improved. Also, where there is only one magnetic head 9 on the upper surface of the disk as in the second embodiment, the shield member 10 can be reduced if the lower shield 12 is made flat. This makes it possible to reduce the thickness of the magnetic disk apparatus 50 further. In the second embodiment, too, a shielding effect against an external magnetic field can be obtained. There is the advantage that malfunction during recording and playback due to external magnetic field can be prevented. Furthermore, the shield member 10 can be installed while maintaining the form factor. In addition, the productivity can be improved. Since the shield member 10 can be thinned, the apparatus can be thinned further.

Third Embodiment

A third embodiment of the present invention is next described using FIG. 11. FIG. 11A is a plan view of a magnetic disk apparatus of the third embodiment of the present invention. FIG. 11B is a cross-sectional view on C-C of FIG. 11A. This third embodiment differs from the first embodiment in the respects described in the following. In the other respects, the third embodiment is fundamentally the same as the first embodiment.

The differences between the third embodiment and the first embodiment are (i) only one magnetic head 9 is on the top surface of the magnetic disk 3, (ii) upper shield 11 and lower shield 12 are flat parallel plates, and (iii) the connecting portion 13 of the first embodiment acts also as a shroud member 22 around the disk. In the third embodiment, respective one end of the upper and lower shields 11 and 12 is connected to the shroud member 22 near the outer fringes of the magnetic disk 3. The shroud member 22 is made of a magnetic material. That is, the shield member 10 is made up of upper shield 11, lower shield 12, and shroud member 22.

As shown in FIG. 11A, the shroud member 22 is positioned at the outer fringes of the magnetic disk 3, and is mounted to extend about half (about 180 degrees) round the magnetic disk 3 on the side where the magnetic head 9*a* exists. The distance between the shroud member 22 and the outer fringes of the disk is preferably reduced from a viewpoint of reduction of flow-induced oscillations in the magnetic disk 3. However, it is necessary to form an appropriate gap to avoid their contact because of variations in machining accuracy. In the third embodiment, this gap is set to about 0.6 mm. Reduction in the flow-induced oscillations in the magnetic disk 3 has become more important issues in 3.5 type magnetic disk apparatus and so on of higher rotational speed. The shroud member 22 can be placed close to the disk end surface more accurately by permitting the shroud member 22 to be mounted to the disk apparatus 50 from the outside. In this way, there is another advantage that the effect of reducing flow-induced oscillations in the magnetic disk 3 can be accomplished readily. Obviously, the third embodiment can be applied to a 3.5 type magnetic disk apparatus as well as to a 2.5 type magnetic disk apparatus.

As can be seen from FIG. 11B, the height Lsh from the upper surface of the disk to the upper end (free end) of the shroud member 22 is greater than the thickness Ls of the magnetic head slider 9 (Lsh>Ls). However, in the portions into which the magnetic head support mechanism 4 and arm 5 move outside the outer fringes of the magnetic disk 3, the height from the upper surface of the disk to the upper end of the shroud member 22 is smaller than the thickness of the magnetic head slider 9.

In the third embodiment, the shroud member 22 acts also as the connecting portion between the upper shield 11 and lower shield 12. The shroud member 22 is mounted to extend about half round the magnetic disk 3 about the magnetic head 9*a*. Furthermore, by setting the height Lsh of the end surface of the shroud member 22 from the disk upper surface greater than the thickness Ls of the magnetic head slider 9, when an external magnetic field almost parallel to the disk surface is applied, magnetic flux 100 enters from one end of the shroud member 22 because the height of the shroud member 22 is greater than the magnetic head slider 9. The flux passes through the shroud member 22 and is guided to the other end of the shroud member 22. A pictorial view of the flow of the magnetic flux 100 is shown in FIG. 11B. In this way, the magnetic flux flows off the magnetic head. Therefore, a shielding effect can be expected even against a magnetic field parallel to the disk surface.

It is to be noted that in the third embodiment, Lsh>Ls is set. Even when both are substantially identical, a shielding effect is exhibited although the effect of the shielding decreases.

As described so far, in the third embodiment, in a case where it is placed in an external magnetic field parallel to the disk surface, a shielding effect can be expected. Also, by making the shroud member 22 a connecting portion, the number of components can be reduced. In addition, fluid-induced oscillations due to the shroud member 22 can be reduced. In the third embodiment, too, there is a shielding effect against an external magnetic field incident perpendicularly to the disk surface in the same way as in the first embodiment.

In the third embodiment, a so-called contact start-stop (CSS) system is adopted, in which when the magnetic disk 3 is at rest, the magnetic head slider 9 makes contact with the disk surface, and during rotation, the slider floats over the disk surface. The CSS system is widely used in 3.5 type apparatus and so on. Therefore, a cutout portion for inserting a ramp for loading and unloading is not formed in the shield member 10. Obviously, the present system can be applied to the loading/unloading system.

Also, in the present embodiment, the shroud member 22 is made to extend about a half circle, for the following reason. For magnetic flux incident parallel to the disk surface from the opposite side of the shroud member 22, the magnetic head 3 is shadowed by the spindle mechanism 2 and so a shielding effect owing to the spindle mechanism 2 made of a magnetic material can be expected. However, it is obvious that if the shroud member 22 is made to extend the whole circle except for the portion in which the arm 5 is inserted, a higher shielding effect (shielding effect against magnetic flux from all the angles) can be expected. In addition, if the shroud member 22 extends over a range narrower than a half circle, a shielding effect against a magnetic field perpendicular to the disk surface is produced.

Fourth Embodiment

Figure 12:
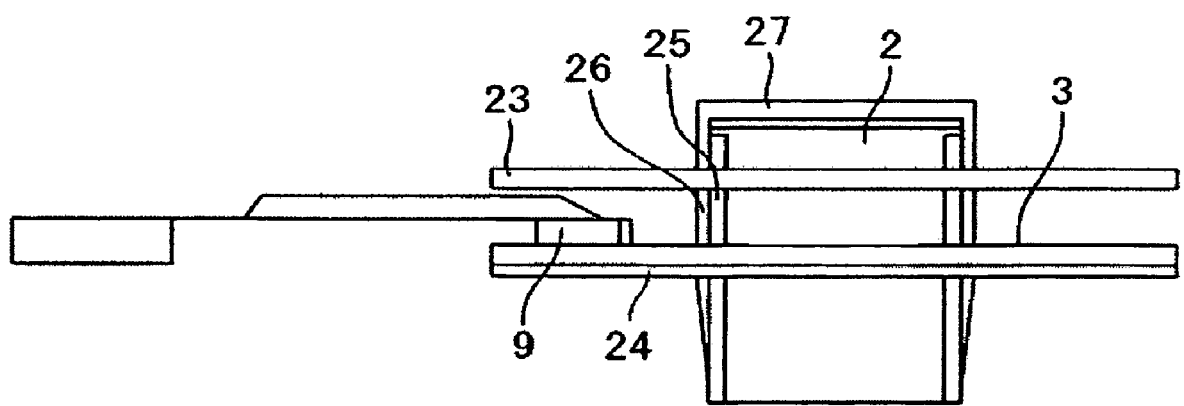
FIG. 12 is a cross-sectional view of main portions of a magnetic disk apparatus of a fourth embodiment of the present invention.

A fourth embodiment of the present invention is next described using FIG. 12. FIG. 12 is a cross-sectional view of main portions of a magnetic disk apparatus of the fourth embodiment of the present invention. This fourth embodiment is different from the first embodiment in the respects described in the following. In the other respects, the fourth embodiment is fundamentally the same as the first embodiment.

The differences between the fourth embodiment and the first embodiment are that (i) the upper shield 11 of the first embodiment is replaced by a shield disk 23 placed above the magnetic head slider 9, (ii) the lower shield 12 of the first embodiment is replaced by a thin film of magnetic material 24 coated on the lower surface side of the magnetic disk 3, and (iii) the connecting portion 13 of the first embodiment is replaced by the spindle mechanism 2. The spindle mechanism 2 has a rotating shaft 25, a spacer 26, and a clamp 27 which are made of a magnetic material.

The shield disk 23 may be made of a magnetic material such as iron or stainless. Also, a shielding effect can be accomplished without fundamentally varying the configuration of the magnetic disk apparatus 50 by bringing the shape of the shield disk 23 into agreement with the shape of the magnetic disk for vertical. The upper shield is held by the clamp 27. The clamp 27 is fixed to the spindle mechanism 2 by screws (not shown). A soft magnetic material (in particular, iron or the like) used as an underlying film of the disk for vertical is used as the thin film of magnetic material 24. The rotating shaft 25 and spacer 26 are magnetically coupled to the shield disk 23 and thin film of magnetic material 24, thus forming a connecting portion between the shield disk 23 and the thin film of magnetic material 24.

In the fourth embodiment, the upper and lower disks 23 and 24 are used as shields and so the space between the upper and lower shields can be narrowed. In addition, it is not necessary to mount additional parts by making the connecting portion a spacer having magnetic characteristics. Additionally, the upper and lower shields can be increased compared with the first embodiment. Therefore, a shielding effect against magnetic flux oblique or parallel to the disk surface can be obtained. Further, in the fourth embodiment, too, a shielding effect against an external magnetic field perpendicular to the disk surface is obtained in the same way as in the first embodiment.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk apparatus comprising:
   a disk-shaped rotary magnetic disk;
   a magnetic head that records information on said magnetic disk or plays back information from said magnetic disk;
   a magnetic head support mechanism that supports said magnetic head;
   a positioning mechanism that moves said magnetic head in a radial direction of said magnetic disk to place the head in position;
   an enclosure having a base and a cover made of a nonmagnetic material; and
   a shield member made of a magnetic material to magnetically shield said magnetic head;
   wherein the enclosure incorporates therein said magnetic disk, said magnetic head, said magnetic head support mechanism, said positioning mechanism, and said shield member; and
   wherein said shield member has an upper shield located above said magnetic head and extending over a range in which said magnetic head moves, a lower shield located on a side opposite to a plane in which said magnetic head exists and extending over the range in which said magnetic head moves, and a connecting portion connecting an outer side end portion of said upper shield and an outer side end portion of said lower shield near outer fringes of said magnetic disk.

2. A magnetic disk apparatus comprising:
   a disk-shaped rotary magnetic disk that records information by a vertical magnetic recording method;
   a magnetic head that records information on said magnetic disk or plays back information from said magnetic disk;
   a magnetic head support mechanism that supports said magnetic head;

a positioning mechanism that moves said magnetic head in a radial direction of said magnetic disk to place the head in position;

an enclosure having a base and a cover made of a nonmagnetic material; and a shield member made of a magnetic material to magnetically shield said magnetic head;

wherein the enclosure incorporates therein said magnetic disk, said magnetic head, said magnetic head support mechanism, said positioning mechanism, and said shield member;

wherein said shield member has an upper shield located above said magnetic head and extending over a range in which said magnetic head moves, a lower shield located on a side opposite to a plane in which said magnetic head exists and extending over the range in which said magnetic head moves, and a connecting portion connecting an outer side end portion of said upper shield and an outer side end portion of said lower shield near outer fringes of said magnetic disk; and wherein said upper shield has a roof portion located above said magnetic head and extending over the range in which said magnetic head moves and a step portion located closer to a surface of the magnetic disk than said roof portion and extending over the range in which said magnetic head moves, the roof portion and the step portion being integrally formed as a single piece.

3. A magnetic disk apparatus of claim 2, wherein said step portion is placed close to the surface of the magnetic disk so as to be located at a side of an end surface of said magnetic head.

4. A magnetic disk apparatus of claim 3, wherein said step portion is formed so as to be larger in wall thickness than said roof portion, and wherein said connecting portion is connected to said step portion and formed so as to be larger in wall thickness than said roof portion.

5. A magnetic disk apparatus of claim 3, wherein said step portion is formed so as to be identical in thickness with said roof portion.

6. A magnetic disk apparatus of claim 3, wherein said step portion is spaced from the surface of said magnetic disk by a distance Lg and said magnetic head has a thickness Ls, and where Ls > Lg.

7. A magnetic disk apparatus comprising:

a disk-shaped rotary magnetic disk that records information by a vertical magnetic recording method;

a magnetic head that records information on said magnetic disk or plays back information from said magnetic disk;

a magnetic head support mechanism that supports said magnetic head;

a positioning mechanism that moves said magnetic head in a radial direction of said magnetic disk to place the head in position;

a ramp mounted close to outer fringes of the magnetic disk such that said magnetic head is retracted to the outside of said magnetic disk when rotation of said magnetic disk has stopped;

an enclosure having a base and a cover made of a nonmagnetic material; and a shield member made of a magnetic material to magnetically shield said magnetic head;

wherein the enclosure incorporates therein said magnetic disk, said magnetic head, said magnetic head support mechanism, and said shield member;

wherein said shield member has an upper shield located above said magnetic head and extending over a range in which said magnetic head moves, a lower shield located on a side opposite to a plane in which said magnetic head exists and extending over the range in which said magnetic head moves, and a connecting portion connecting an outer side end portion of said upper shield and an outer side end portion of said lower shield near outer fringes of said magnetic disk; and wherein said connecting portion is disposed in a dead space surrounded by side walls of said ramp and said base and by outer fringes of said magnetic disk.

8. The magnetic disk apparatus of claim 7, wherein said upper shield, said lower shield, and said connecting portion are provided with cutout portions in side surfaces corresponding to said ramp, and said magnetic head goes into and out of said ramp through said cutout portions.

* * * * *